United States Patent [19]

Kohli

[11] Patent Number: 4,999,321
[45] Date of Patent: Mar. 12, 1991

[54] OPTICAL GLASS COMPOSITION

[75] Inventor: Jeffrey T. Kohli, Alfred, N.Y.

[73] Assignee: Alfred University, Alfred, N.Y.

[21] Appl. No.: 487,102

[22] Filed: Mar. 2, 1990

[51] Int. Cl.$^5$ .............................................. C03L 3/253
[52] U.S. Cl. ....................................................... 501/42
[58] Field of Search ........................................... 501/42

[56] References Cited

U.S. PATENT DOCUMENTS 3,745,032  7/1973  Miller et al. .......................... 501/42
4,771,020  9/1986  Omata ................................... 501/42

Primary Examiner—Mark L. Bell
Attorney, Agent, or Firm—Howard J. Greenwald

[57] ABSTRACT

A durable, optically isotropic glass composition which contains 50–75 percent of germania, 10–25 percent of alumina and/or gallia, and 10–25 percent of terbium oxide and/or dysprosium oxide and/or gadolinium oxide.

18 Claims, 3 Drawing Sheets

OPTICAL GLASS COMPOSITION

FIELD OF THE INVENTION

A durable glass composition containing germania, a rare earth oxide, and either alumina or gallia.

BACKGROUND OF THE INVENTION

Glass compositions which exhibit the Faraday rotation phenomenon (in which plane polarized light which is transmitted through the glass is rotated due to the magnetic properties of the glass) are well known to those skilled in the art. Some of these compositions are described in, e.g., M. J. Weber's "Faraday Rotator Materials" (Lawrence Livermore Laboratory, Livermore, Calif., 1982).

For many applications, it is desirable that glass compositions which exhibit the Faraday rotation effect be transparent in both the visible and the infrared region of the light spectra. Thus, for example, many optical switches, modulators, and laser isolators could be constructed with a glass composition which is both transparent and which exhibits the Faraday effect in the infrared region of the spectrum. Unfortunately, a glass composition is not presently available which exhibits a strong Faraday effect (high Verdet coefficient) and is transparent beyond 4–5 microns.

It is an object of this invention to provide a glass composition which exhibits the Faraday rotation effect and which is substantially transparent over the entire spectrum from 400 to 6,000 nanometers.

It is another object of this invention to provide a glass composition which is more resistant to attack by water, base, and/or acid than prior art glass compositions and which has a relatively high transmittance in the infrared region of the light spectrum.

It is yet another object of this invention to provide a durable glass composition, suitable for optical switching applications, which has a transmittance greater than about 70 percent over the range of from about 400 to about 6,000 nanometers and which, in addition, does not show a substantial change in this transmittance over time even after being exposed to moisture.

SUMMARY OF THE INVENTION

In accordance with this invention, there is provided a durable, optically isotropic glass composition which is substantially transparent throughout the range of from 400 to 6,000 nanometers. This glass contains from about 50 to about 75 mole percent of germania, from about 10 to about 25 mole percent of gallia and/or alumina, and from about 10 to about 25 mole percent of one or more specified rare earth oxides.

DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
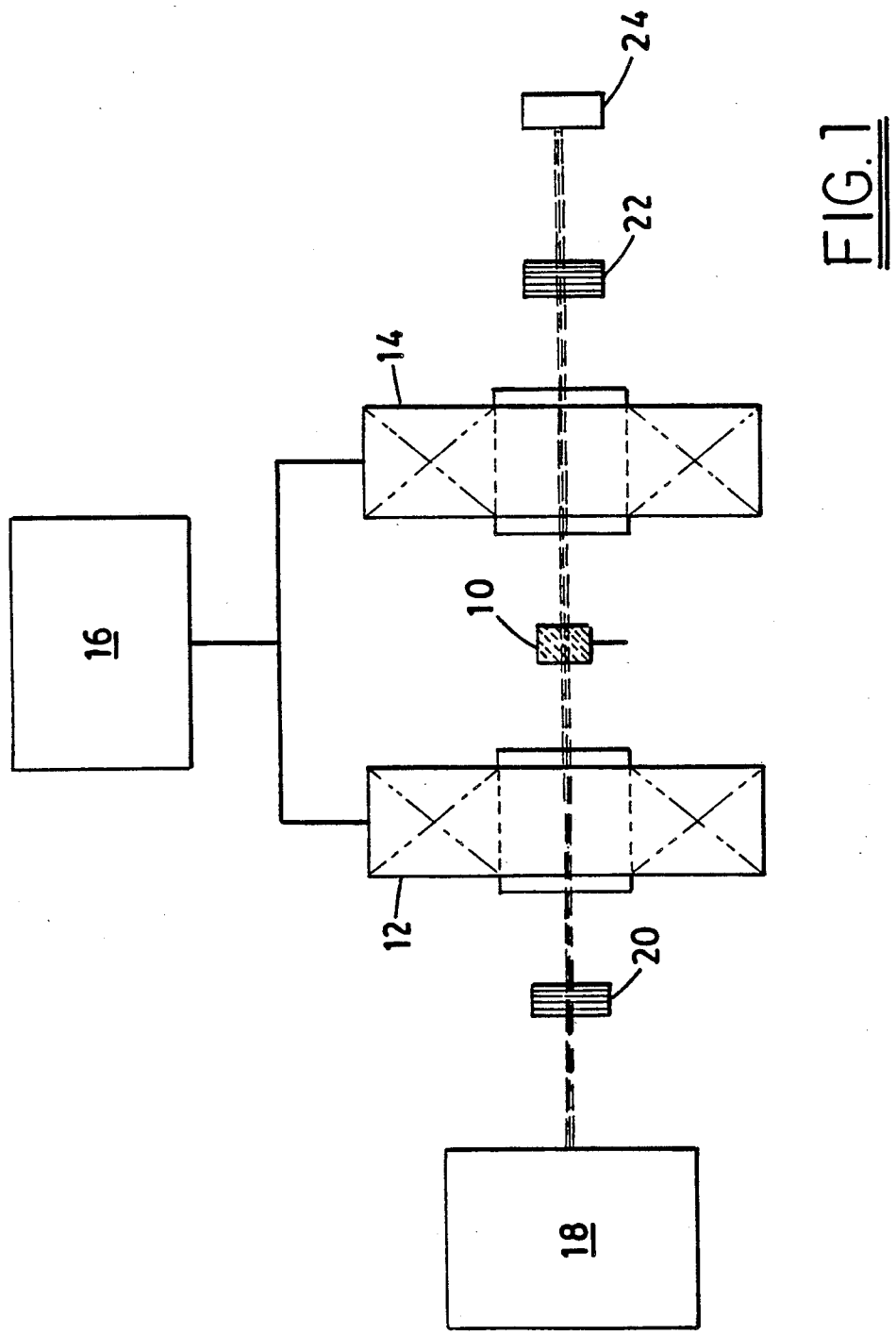
FIG. 1 is a schematic of the experimental set up used to measure the Verdet constants of the compositions of this invention.

The glass composition of this invention is comprised of from about 50 to about 75 mole percent of germania, from about 10 to about 25 mole percent of an oxide selected from the group consisting of gallia, alumina, and mixtures thereof, and from about 10 to about 25 mole percent of an oxide selected from the group consisting of terbium oxide, dysprosium oxide, gadolinium oxide, and mixtures thereof. Other ingredients may be present in the glass in concentrations of up to about 10 mole percent.

The glass composition of this invention contains from about 50 to about 75 mole percent of germania. It is preferred that the composition comprise from about 50 to about 70 mole percent of germania.

The germania used to prepare the glass composition preferably has substantially all of its particles smaller than about 10 microns. In a more preferred embodiment, substantially all the germania particles have a particle size in the range of from about 0.5 to about 10 microns. The particle size analysis of the germania may be conducted by conventional means such as, e.g., with a Micromeritics SediGraph 3100 (available from the Micromeritics Instrument Corporation, Norcross, Ga.). Particle size analysis may be conducted in accordance with the procedure described in U.S. Pat. No. 4,282,006 of James E. Funk, the disclosure of which is hereby incorporated by reference into this specification.

It is preferred that the germania used to prepare the glass composition of this invention be at least about 99.9 percent pure. Thus, by way of illustration and not limitation, one may use reagent numbers 11155 or 10510 available from the 1989–1990 AESAR catalog (Johnson Matthey/AESAR Group, Seabrook, N.H.), the disclosure of which is hereby incorporated by reference into this specification.

The second oxide used to produce the glass composition of this invention is selected from the group consisting of gallium oxide, aluminum oxide, and mixtures thereof. From about 10 to about 25 mole percent of such oxide(s) is present in the glass. In one preferred embodiment, from about 15 to about 25 mole percent of such oxide(s) is used. The particle size of such oxide(s) used to prepare the glass also is preferably less than 10 microns and, more preferably, is in the range of from about 0.5 to about 10 microns.

The gallia and/or alumina preferably is at least about 99.9 percent pure. Thus, for example, suitable gallium oxide reagents include reagent numbers 10508, 11151, and 13968 from the aforementioned AESAR catalog. Suitable alumina reagents include, e.g., numbers 10461, 10459, 14558, and 10627.

The third oxide used to prepare the glass composition of this invention is a rare earth oxide selected from the group consisting of terbium oxide, dysprosium oxide, gadolinium oxide, and mixtures thereof. These oxide reagents also should have a particle size less than about 10 microns and, preferably, from about 0.5 to about 10 microns; and they also should be at least about 99.9 percent pure. Suitable terbium oxide reagents include, e.g., numbers 12905, 11207, 11208, and 10917 from the AESAR catalog. Suitable dysprosium oxide reagents include numbers 12924, 11319, 11318, and 10906 from the AESAR catalog. Suitable gadolinium oxide reagents include numbers 11,291, 11290, and 10,909 from the AESAR catalog.

The glass composition of this invention is comprised of at least 85 mole percent of a mixture of at least three oxides selected from the group consisting of said germanium oxide, said gallia, said alumina, said terbium oxide, said dysprosium oxide, and said gadolinium oxide. It is preferred that the composition comprise at least 90 mole percent of said mixture of oxides.

The glass composition of this invention may also be comprised of from about 0 to about 15 mole percent of one or more additives to improve glass formability and/or stability. As is well known to those in the art, such additives include the oxides of the metals of groups 1a and 11a of the periodic table such as, e.g., the oxides of rubidium, strontium, barium, calcium, magnesium, sodium, potassium, and mixtures thereof. Other suitable additives include the oxides of lead, bismuth, yttrium, and lanthanum, and mixtures thereof. Oxides of the rare earth metals (cerium, praseodymium, neodymium, samarium, europium, gadolinium, holmium, erbium, thulium, ytterbium, lutetium) also may be used.

The reagents described above may be made into glass by conventional means. Thus, the reagent powders may be dry-mixed and blended until a homogeneous mixture is obtained. Thus, e.g., one may use a V-blender. The powder blend is charged to a nonreactive container such as, e.g., one made from platinum or platinum/-rhodium alloy, and the blend is then melted in air by heating it to a temperature of from about 1,480 to about 1,550 degrees Celsius. The glass melt may then be cast into a mold, quenched, drawn into a fiber, or otherwise further processed as is well known to those skilled in the art.

The composition of this invention has a unique combination of properties. It is a durable glass, and thus can readily be formed into a variety of shapes. It is optically isotropic, i.e., not birefringent. It is transparent in the near- and mid-infrared regions and the visible-region of the light spectrum. Furthermore, in one embodiment, it exhibits a substantial Faraday rotation effect. In another preferred embodiment, it has a transmittance of at least about 70 percent over the range of from about 400 to about 6,000 nanometers and a refractive index of at least about 1.85 at the sodium D-line (589.3 nanometers).

The composition of this invention, because it is a glass, can be formed into many suitable shapes such as, e.g., a lens, a laser isolator, an optical fiber, and the like. Furthermore, because it is optically isotropic, it is not birefringent. As used in this specification, the term optically isotropic refers to a composition which has the same optical properties in all of its dimensions. It is to be distinguished from a birefringent composition, such as terbium garnet or other crystalline materials, whose optical properties will vary depending upon the crystalline orientation of the material, i.e., which face of the crystal the light impacts. See, for example, pages 2–29 to 2–31 of George W. McLellan et al.'s "Glass Engineering Handbook," Third Edition (McGraw-Hill Book Company, New York, 1984), the disclosure of which is hereby incorporated by reference into this specification.

In addition to being optically isotropic, the glass composition is substantially transparent to light at a wavelength of from about 400 to about 6,000 nanometers. Because of this broad range over which it is transparent to light, it may be used in any number of different applications requiring such transparency with a wide number of different light sources, including, e.g., infrared light. Thus, for example, in one preferred embodiment, it may be used for Faraday rotator applications which require optically transparent materials.

Faraday rotation has several practical applications. It may be used in the construction of fast optical switches, modulators, and isolators, and as a nonreciprocal element in laser gyroscopes. It may be used for laser sensing of magnetic fields associated with high transmission lines. The glass composition of this invention may be used in conjunction with the carbon monoxide laser. See, for example, M. J. Weber's "Faraday Rotator Materials" (Lawrence Livermore Laboratories, Livermore, Calif., 1982), the disclosure of which is hereby incorporated by reference into this specification.

In one preferred embodiment, the composition of this invention is used to detect rotational motion by means of infrared rays. In another embodiment, the composition is used as a magnetic sensor with infrared light. In yet another embodiment, the composition is used as a infrared heat sensor. Each of these applications require a composition which is both optically transparent in the specified range, which is optically isotropic, and which exhibits the Faraday rotation effect.

As is known to those skilled in the art, the transmittance of light through a glass composition is represented by the ratio between the intensity of the emerging beam and that of the incident beam; see, e.g. pages 2–32 to 2–36 of McLellan et al.'s "Glass Engineering Handbook," supra. In a glass which is transparent to a given light source, such ratio is usually at least 0.5.

The trasmittance measurements for the visible and near infrared regions (which extend from about 400 to about 2000 nanometers) may be made on commercially available spectrophotometric equipment such as, e.g., the Varian UV-Vis-NIR Spectrophotometer, 2300 Series (Varian Instruments, Palo Alto, Calif.). Measurements may be made on this instrument in accordance with Publication Number 87-175-111, Revision A682, available from Varian Instruments, the disclosure of which is hereby incorporated by reference into this specification.

The transmittance measurements for the infrared region (from about 2.5 to about 7 microns) may be made on a Perkin-Elmer Dual Beam Infrared Spectrophoteter, model number 1430 (available from Perkin Elmer Corp., Norwalk, Conn.). Measurements may be made on this instrument in accordance with the Perkin Elmer Instructions Manual for Models 1420 1430 Infrared Spectrophotometers (Revised Jan. of 1983).

In one preferred embodiment, a glass of the composition $20Tb_2O_{3.5}/20Ga_2O_3/60GeO_2$ exhibits a substantial Faraday rotation effect. At a wavelength of 543.5 nanometers, it has a Verdet coefficient of at least about $-101.5$ radians/Tesla-meter. At a wavelength of 632.8 nanometers, it has a Verdet coefficient of at least about $-75.5$ radians/Tesla-meter.

FIG. 1 illustrates an apparatus for measuring the Verdet coefficients of glass compositions. Referring to FIG. 1, sample 10 is held in a sample holder (not shown). Toroidal electromagnets 12 and 14 are situated on each side of the sample so that the magnetic field is in the direction of light propagation. There is an opening (not shown) in each of these electromagnets through which light may pass; and these electromagnets are capable of producing a magnetic field of from 0 to 21,000 Gauss. Adjustable power supply 16 is used to create the magnetic field in electromagnets 12 and 14.

A variable, monochromatic source of light 18 is directed through polarizer 20 and thence through the openings (not shown) in electromagnets 12 and 14. The light passing through the opening in electromagnetic 14 is polarized by a rotating polarizer 22, which is rotated until no light passes through it (i.e., extinction), at which point a measurement of the degree of rotation is obtained. Detector 24 determines when extinction occurs.

The method illustrated in FIG. 1 for measuring the Verdet coefficient is well known to those skilled in the art and is described in, e.g., pages 15-16 of M. J. Weber's "Faraday Rotator Materials," supra.

The rotation of the plane of polarization of light is given by: theta=VlH·n, wherein theta is the rotation angle (in radians), V is the Verdet constant, l is the length of the rotator material through which light is transmitted (in centimeters), H is the strength of the applied magnetic field (in Gauss or Tesla), and n is the unit vector in the direction of light propagation. This relationship is discussed in an article by Nicholas F. Borrelli, "Faraday Rotation in Glasses," The Journal of Chemical Physics, Volume 41, Number 11, Dec. 1, 1964, the disclosure of which is hereby incorporated by reference into this specification.

The glass composition of this invention is substantially more durable than prior art Faraday rotator materials made from phosphate and/or fluorophosphate and/or fluoride-based glasses and/or lead gallate glasses, having improved resistance to attack by water, acid, and base.

When subjected to a specified durability test (described below), the glass composition of this invention loses less than 0.08 percent of its weight.

In the durability test of this invention, a rectangular plate of the glass composition is cut to dimensions of 1.0 centimeter×2.0 centimeters×0.1 centimeters. This rectangular sample is then weighed, and thereafter it is placed on the bottom of a 250 milliliter "TEFLON" beaker equipped with a mesh bottom. This beaker is then filled with 200 milliliters of distilled water, and the glass/beaker/water assembly is then placed into a 500 milliliter "TEFLON" beaker filled with distilled water which is equipped with a pedestal on which the smaller, 250 milliliter beaker sits; thus, water is allowed to flow from the bottom of the larger beaker, through the mesh bottom of the smaller beaker, and in contact with the bottom surface of the glass sample. The large beaker/small beaker/water/glass sample assembly is then placed into Fisher scientific "VERSABATH", model number 224 (see page 101 of the Fisher '88 catalog) which maintains the water in it at a temperature of 50 degrees Celsius and which is operated at 50 revolutions per minute for 50 hours. After 50 hours of exposure to the flowing distilled water, the beakers are removed from the shaker, the sample is removed from the small beaker, the sample is dried, and then the sample is weighed. The weight loss (the difference between the weight at time zero and the weight at 50 hours) is determined, and the weight loss is then divided by the time zero weight. The weight loss is less than 0.08 percent of the initial weight.

In one preferred embodiment of this invention, an optical glass is provided which is not only durable, and optically isotropic, but possesses a high degree of transmittance over the near-infrared spectrum (from 400 nanometers) into the far-infrared region (about 6,000 nanometers). As will be apparent to those skilled in the art, this embodiment is especially useful for optical switching applications.

Optical switches are described, e.g., in an article by Eva M. Vogel entitled "Glasses as Nonlinear Photonic Materials," Journal of the American Ceramic Society, 72 (5) 719-24 (1989), the disclosure of which is hereby incorporated by reference into this specification. The glasses of this invention are particularly suitable for the applications described in the paper, for they have both durability, high transmittance over a wide range, and a high refractive index. The refractive index of the glass compositions of this invention is greater than about 1.85 at the sodium-D line. Refractive index may be measured by techniques well known to those skilled in the art. Thus, for example, reference may be had to George W. McLellan et al.'s "Glass Engineering Handbook," Third Edition (McGraw-Hill Book Company, New York, 1984), the disclosure of which is hereby incorporated by reference into this specification.

As is known to those skilled in the art, the nonlinear refractive index coefficient varies with the intensity of the input light, and this phenomenon is especially significant with glasses of high refractive index. Thus, for example the aforementioned Vogel article discloses how this property may be used to construct self-induced switching optical waveguides; see, e.g., pages 720 and 722 of this article.

Figure 2:
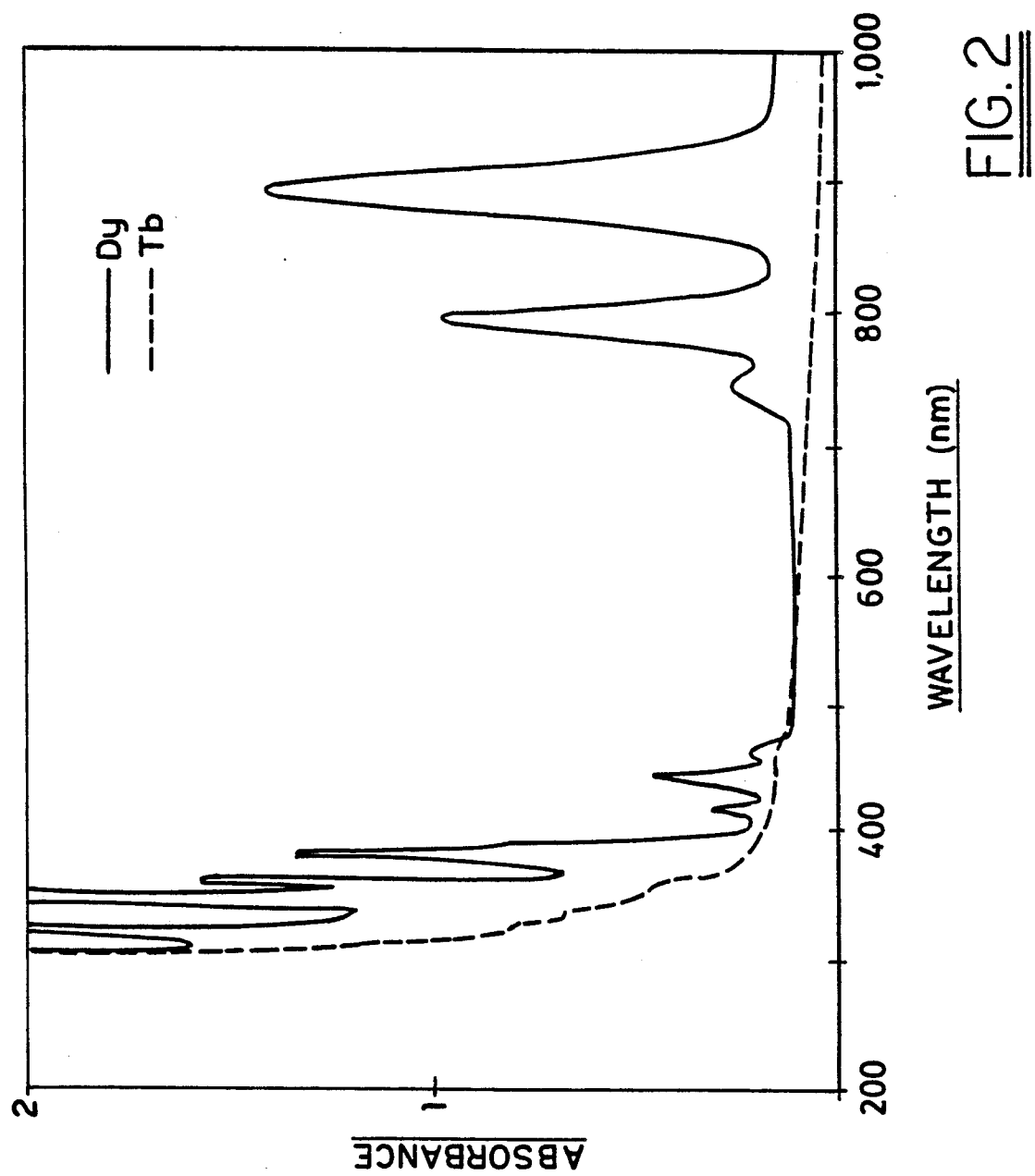
FIG. 2 is a graph of the visible and near-infrared spectra obtained from the experiments described in Examples 1 and 2.

In one preferred embodiment, in which the aforementioned rare earth oxide is preferably gadolinium oxide, the glass of this invention is used to make a directional coupler (self-induced switching), a Mach-Zehnder interferometer (control beam), an ultrafast all-optical dual core coupler, and the like, in accordance with the configurations described in FIGS. 2 and 4 of the Vogel article.

The following examples are presented to illustrate the claimed invention but are not to be deemed limitative thereof. Unless otherwise specified, all parts are by weight and all temperatures are in degrees Celsius.

EXAMPLE 1

3.586 grams of germanium oxide (catalog number 11155, obtained from the 1989-1990 Johnson Matthey/AESAR Group catalog, Lafayette Road, Seabrook, N.H.), 2.142 grams of gallium oxide (catalog number 10508, obtained from the 1989-1990 Johnson Matthey/AESAR Group catalog), and 4.272 grams of terbium oxide (catalog number 11207B, obtained from the 1989-1990 AESAR catalog) were charged to a mortar and pestle and mixed for 2.5 minutes. This mixture was then charged to a 35 milliliter capacity platinum/rhodium crucible (shown on page 282 of the 1989-1990 AESAR catalog). The crucible containing the mixture was put into a Thermolyne High-Temperature furnace, type 46100, model number F46128C. The mixture was heated to a temperature of about 1535 degrees Celsius in air for 20 minutes, producing a glass melt.

The crucible containing the glass melt was removed from the furnace, and the bottom of the crucible was placed in room temperature water for 2 seconds and then placed upon an alumina refractory brick, where it was allowed to cool to ambient temperature.

The glass formed in the crucible was removed, and the glass was then annealed. The glass was put in an annealing furnace (Fisher Isotemp Programmable Ashing Furnace, model number 497, Fisher Scientific, Pittsburgh, Pa.) where it was placed upon a refractory brick in such furnace. The temperature of the annealing furnace was then raised from ambient to a temperature of 790 degrees Celsius over a period of about 120 minutes. Once the sample was at this temperature, it was maintained there for 30 minutes. Thereafter, the glass was then cooled to 400 degrees Celsius at a rate of 1 degree Celsius per minute. After the sample had reached 400 degrees Celsius, it was cooled to ambient at a rate of 5 degrees per minute.

The annealed glass was then removed from the furnace. A rectangular slab of about 1 centimeter×2 centimeters×1 millimeter was cut from the annealed specimen on a low-speed diamond saw (Buehler Isomet Low Speed Saw, model number 11-1180, Buehler Limited, Lake Bluff, Ill.).

Figure 3:
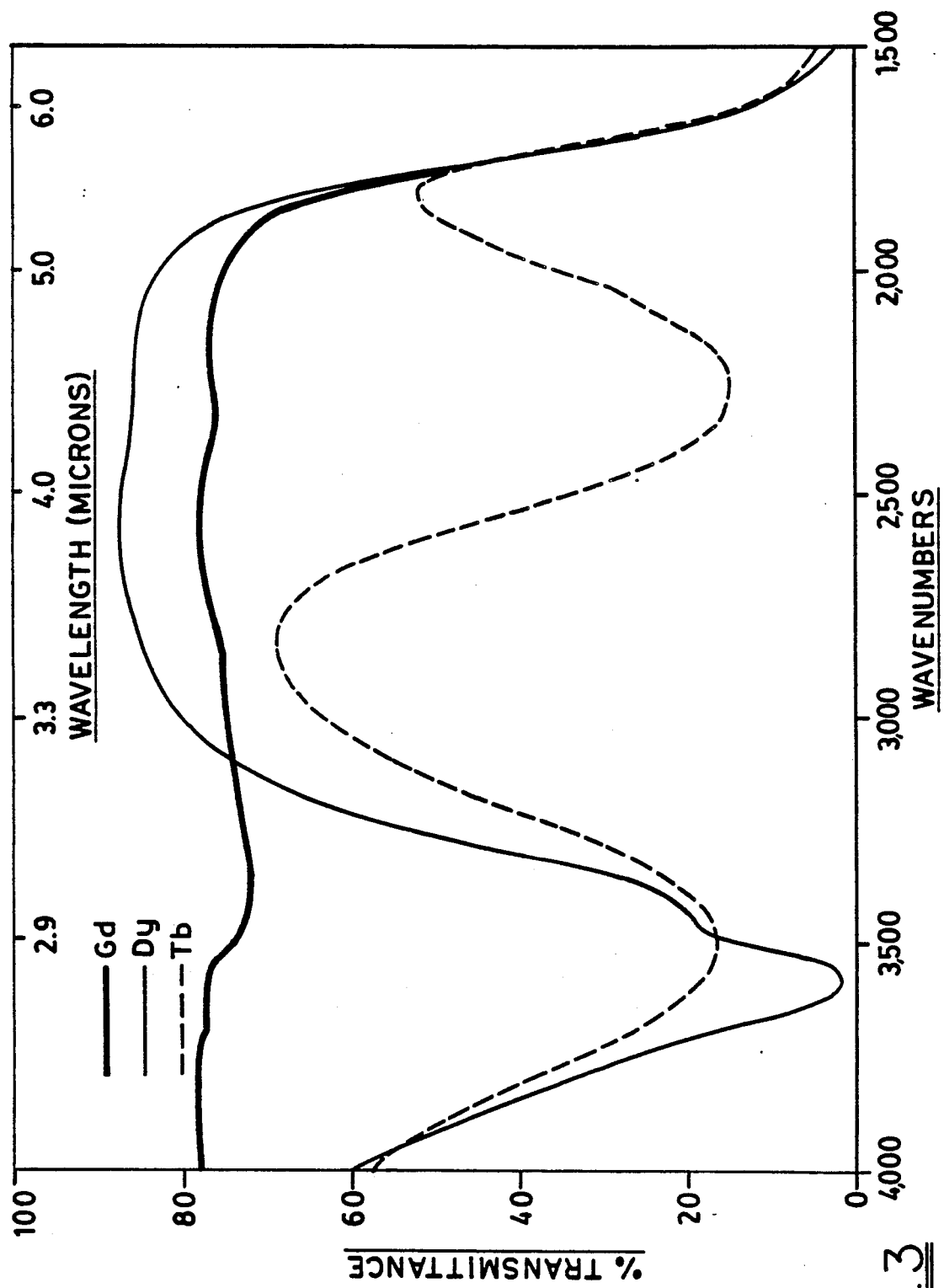
FIG. 3 is a graph of the mid-infrared spectra obtained from the experiments described in Examples 1, 2, and 3.

The rectangular slab was then polished until all visible scratches and surface irregularities were removed with a Buehler grinding/polishing apparatus (Buehler Econmet III Polisher/Grinder, available from the Buehler company of Lake Bluff, Ill.) using cerium oxide as the polishing compound (Buehler Cerium Oxide Polishing Compound, Micromet No. 40-6355-006). The ground slab was then tested for absorbance/transmittance in the visible and near infrared and mid-infrared regions; the spectra obtained are shown in FIGS. 2 and 3. The spectra of these Figures were normalized to a sample thickness of 1.0 millimeter.

The Verdet constants for the polished sample were determined in accordance with the equation described by Borelli (and discussed elsewhere in this specification). The experimental set up shown in FIG. 1 was used. The sample holder 10 was an aluminum fixture. Adjustable power supply 16 converts alternating current to sufficient direct current to induce an electromagnetic field which may be varied from 0 to 21,000 Gauss. Magnets 12 and 14 were each toroidal magnets with outer diameters of 2.0 feet, openings in their middle 1 centimeter in diameter, and thicknesses of 3.0 inches. Polarizers 20 and 22 were Oriel 25010 Standard Polarizer Rotators, catalog number 06497-0872, Oriel company, Stratford, Conn.). Detector 24 was an Oriel Photomultiplier Detection System, model 7070.

Measurements were taken at wavelengths of 632.8 and 543.5 nanometers and at magnetic fields of 5,000, 10,000, and 15,000 Gauss. The rotation results were normalized to a sample thickness of 1.0 millimeter. The results are shown in Tables 1 (632.8 nanometers) and 2 (543.5 nanometers) which list, for each experiment, the magnetic field, the degree of rotation, and the Verdet constant.

TABLE 1

| Magnetic Field (Tesla) | Rotation/m.m. (Degrees) | Verdet Constant (Radians/T-m) |
|---|---|---|
| 0.75 | 3.3 | −76.9 |
| 1.00 | 4.5 | −77.9 |
| 1.50 | 6.5 | −75.1 |

TABLE 2

| Magnetic Field (Tesla) | Rotation/m.m. (Degrees) | Verdet Constant (Radians/T-m) |
|---|---|---|
| 0.75 | 4.5 | −106.0 |
| 1.00 | 6.1 | −106.5 |
| 1.50 | 8.7 | −101.5 |

EXAMPLE 2

The procedure of Example 1 was substantially followed, with the exception that the composition used contained 20 mole percent of dysprosium oxide instead of the 20 mole percent of terbium oxide. The dysprosium oxide used was obtained from Alfa (catalog number 27102), Danvers, Ma. The results obtained in these experiments are shown in Tables 3 (632.8 nanometers) and 4 (543.5 nanometers); in these Tables, the rotation results (Column 2) are shown per millimeter sample thickness, and the Verdet Constant results (Column 3) are shown per meter sample thickness. The spectra obtained from the experiments of Examples 1 and 2 are shown in FIGS. 2 and 3 (results normalized for 1.0 millimeter sample thickness).

TABLE 3

| Magnetic Field (Tesla) | Rotation/m.m. (Degrees) | Verdet Constant (Radians/T-m) |
|---|---|---|
| 0.75 | 3.2 | −73.5 |
| 1.00 | 4.0 | −69.7 |
| 1.50 | 5.9 | −68.4 |

TABLE 4

| Magnetic Field (Tesla) | Rotation/m.m. (Degrees) | Verdet Constant (Radians/T-m) |
|---|---|---|
| 0.75 | 4.1 | −95.6 |
| 1.00 | 5.5 | −96.2 |
| 1.50 | 8.1 | −94.6 |

EXAMPLE 3

In substantial accordance with the procedure of Example 1 a glass of the composition 20 $Gd_2O_3$/20$Ga_2O_3$/60$GeO_2$ was prepared. 4.197 grams of gadolinium oxide, 2.170 grams of germanium oxide, 3.633 grams of gallium oxide were used.

The transmittance of the glass of this Example was determined in accordance with the procedure described in the specification. Its transmittance was in excess of 70 percent over the range from 2000 to 4000 nanometers (per millimeter thickness). A plot of the transmittance of the glass of this Example is shown in FIG. 3.

EXAMPLE 4

The durability of the glass of example 2 was determined in accordance with the procedure described in the specification. The glass sample, which at time zero weighed 1.200 grams, showed no weight loss after fifty hours of water exposure when measured on a Metler balance to 0.1 of a milligram.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. An isotropic glass composition which comprises from about 50 to about 75 mole percent of germania, from about 10 to about 25 mole percent of an oxide selected from the group consisting of gallia, alumina, and mixtures thereof, and from about 10 to about 25 mole percent of an oxide selected from the group consisting of terbium oxide, dysprosium oxide, gadolinium oxide, and mixtures thereof, wherein said glass composition is comprised of at least about 85 mole percent of a mixture of oxides selected from the group consisting of germania, gallia, alumina, terbium oxide, gadolinium oxide, and dysprosium oxide.

2. An isotropic glass composition which comprises from about 50 to about 75 mole percent of germania, from about 10 to about 25 mole percent of an oxide selected from the group consisting of gallia, alumina, and mixtures thereof, and from about 10 to about 25 mole percent of an oxide selected from the group consisting of terbium oxide, dysprosium oxide, and mixtures thereof, wherein said glass composition is comprised of at least about 85 mole percent of a mixture of oxides selected from the group consisting of germania, gallia, alumina, terbium oxide, and dysprosium oxide.

3. The glass composition as recited in claim 2, wherein said glass composition is comprised of from about 50 to about 70 mole percent of germania.

4. The glass composition as recited in claim 3, wherein said glass composition is comprised of from about 10 to about 25 mole percent of alumina.

5. The glass composition as recited in claim 3, wherein said glass composition is comprised of from about 10 to about 25 mole percent of gallia.

6. The glass composition as recited in claim 5, wherein said glass composition is comprised of from about 10 to about 25 mole percent of terbium oxide.

7. The glass composition as recited in claim 6, wherein said glass composition is comprised of about 60 mole percent of germania, about 20 mole percent of gallia, and about 20 mole percent of terbium oxide.

8. The glass composition as recited in claim 5, wherein said glass composition is comprised of from about 10 to about 25 mole percent of dysprosium oxide.

9. The glass composition as recited in claim 8, wherein said glass composition is comprised of at least about 90 mole percent of germania, gallia, and dysprosium oxide.

10. The glass composition as recited in claim 9, wherein said glass composition is comprised of about 60 mole percent of germania, about 20 mole percent of gallia, and about 20 mole percent of dysprosium oxide.

11. A glass composition comprised of about from about 50 to about 75 mole percent of germania, from about 10 to about 25 mole percent of an oxide selected from the group consisting of gallia, alumina, and mixtures thereof, and from about 10 to about 25 mole percent of gadolinium oxide.

12. The glass composition as recited in claim 11, wherein said glass composition is comprised of from about 50 to about 70 mole percent of germania.

13. The glass composition as recited in claim 12, wherein said glass composition is comprised of from about 10 to about 25 mole percent of alumina.

14. The glass composition as recited in claim 13, wherein said glass composition is comprised of from about 10 to about 25 mole percent of a mixture of alumina and gallia.

15. The glass composition as recited in claim 12, wherein aid glass composition is comprised of from about 10 to about 25 mole percent of gallia.

16. The glass composition as recited in claim 15, wherein said glass composition is comprised of about 60 mole percent of germania.

17. The glass composition as recited in claim 16, wherein said glass composition is comprised of about 20 mole percent of gallia.

18. The glass composition as recited in claim 17, wherein said glass composition is comprised of about 20 mole percent of gadolinium oxide.

* * * * *